(12) United States Patent
Daimou et al.

(10) Patent No.: US 9,264,094 B2
(45) Date of Patent: Feb. 16, 2016

(54) VOICE CODING DEVICE, VOICE DECODING DEVICE, VOICE CODING METHOD AND VOICE DECODING METHOD

(75) Inventors: Katsunori Daimou, Osaka (JP);
 Masahiro Oshikiri, Kanagawa (JP);
 Hiroyuki Ehara, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 134 days.

(21) Appl. No.: 14/123,841

(22) PCT Filed: May 25, 2012

(86) PCT No.: PCT/JP2012/003409
 § 371 (c)(1),
 (2), (4) Date: Dec. 4, 2013

(87) PCT Pub. No.: WO2012/169133
 PCT Pub. Date: Dec. 13, 2012

(65) Prior Publication Data
 US 2014/0122065 A1   May 1, 2014

(30) Foreign Application Priority Data

Jun. 9, 2011 (JP) .................................. 2011-129428
Aug. 5, 2011 (JP) .................................. 2011-172393

(51) Int. Cl.
 *G10L 19/00* (2013.01)
 *H04B 1/66* (2006.01)
 (Continued)

(52) U.S. Cl.
 CPC ............ *H04B 1/667* (2013.01); *G10L 19/0204* (2013.01); *G10L 19/24* (2013.01); *G10L 19/02* (2013.01); *G10L 21/038* (2013.01)

(58) Field of Classification Search
 CPC ....... G10L 19/02; G10L 19/24; G10L 21/038; G10L 19/0208
 USPC ........................... 704/E19.001, 225, 205, 500
 See application file for complete search history.

(56) References Cited

U.S. PATENT DOCUMENTS 5,819,212 A    10/1998  Matsumoto et al.
6,507,820 B1 *  1/2003  Deutgen ............... G10L 21/038
                                                  704/206

(Continued)

FOREIGN PATENT DOCUMENTS

CN    1154013    7/1997
EP    0554081    8/1993

(Continued)

OTHER PUBLICATIONS

European Extended Search Report dated Feb. 21, 2014.

(Continued)

*Primary Examiner* — Paras D Shah
*Assistant Examiner* — Forrest F Tzeng
(74) *Attorney, Agent, or Firm* — Greenblum & Bernstein, P.L.C.

(57) ABSTRACT

A voice coding device capable of preventing overall quality degradation even when the bit rate for coding is lowered. The voice coding device codes a wide band signal in a first layer, and codes an extended band signal whose frequency band is located in higher frequency than the wide band signal in an extended band layer. An adaptive band selection unit (301) selects a frequency band to be excluded from a coding object in the extended band layer or a frequency band whose energy is to be attenuated in the extended band layer. A band-limited signal generation unit (302) excludes, within the frequency band of an input signal, the frequency band selected by the adaptive band selection unit (301) from the coding object, or attenuates the energy of the frequency band selected by the adaptive band selection unit (301).

4 Claims, 17 Drawing Sheets

(51) Int. Cl.
*G10L 19/24* (2013.01)
*G10L 19/02* (2013.01)
*G10L 21/038* (2013.01)

(56) References Cited

U.S. PATENT DOCUMENTS

| | | | | |
|---|---|---|---|---|
| 6,539,355 | B1* | 3/2003 | Nishiguchi | G10L 21/038 704/223 |
| 7,162,415 | B2* | 1/2007 | Holzrichter | G10L 19/00 704/201 |
| 7,184,961 | B2* | 2/2007 | Sato | H04B 1/667 341/50 |
| 7,724,638 | B2 | 5/2010 | Murakami et al. | |
| 2001/0044712 | A1* | 11/2001 | Vainio | G10L 19/18 704/201 |
| 2002/0007280 | A1* | 1/2002 | McCree | G10L 19/0208 704/500 |
| 2004/0125878 | A1* | 7/2004 | Liljeryd | H04B 1/667 375/242 |
| 2005/0238185 | A1* | 10/2005 | Suzuki | G10H 1/20 381/106 |
| 2007/0124136 | A1* | 5/2007 | Den Brinker | G10L 21/038 704/205 |
| 2008/0059155 | A1* | 3/2008 | Iser | G10L 21/038 704/205 |
| 2008/0097751 | A1* | 4/2008 | Tsuchinaga | G10L 21/038 704/205 |
| 2008/0126086 | A1* | 5/2008 | Vos | G10L 19/0208 704/225 |
| 2008/0300866 | A1* | 12/2008 | Mukhtar | G10L 21/038 704/205 |
| 2010/0063803 | A1* | 3/2010 | Gao | G10L 21/0364 704/205 |
| 2010/0063827 | A1* | 3/2010 | Gao | G10L 21/038 704/500 |
| 2010/0284550 | A1* | 11/2010 | Oh | G10L 19/008 381/119 |
| 2011/0137660 | A1* | 6/2011 | Strommer | G10L 19/26 704/500 |
| 2012/0101824 | A1* | 4/2012 | Chen | G10L 19/26 704/500 |
| 2012/0235015 | A1* | 9/2012 | Nomura | C09B 23/105 250/200 |

FOREIGN PATENT DOCUMENTS

| | | |
|---|---|---|
| EP | 1916652 | 4/2008 |
| JP | 07-327014 | 12/1995 |
| JP | 09-127987 | 5/1997 |
| JP | 2008-107415 | 5/2008 |
| JP | 2010-224180 | 10/2010 |

OTHER PUBLICATIONS

Bosi et al.: "Introduction to Digital Audio Coding and Standards" In: "Introduction to Digital Audio Coding and Standards", Kluwer Academic Publishers, XP055099192, pp. 200-205, Jan. 1, 2003.
Recommendation ITU-T G.718 (2008), Amendment 2 (Mar. 2010), Annex B, Mar. 2010.
International Search Report in PCT/JP2012/003409, mailed Aug. 28, 2012.

* cited by examiner

VOICE CODING DEVICE, VOICE DECODING DEVICE, VOICE CODING METHOD AND VOICE DECODING METHOD

TECHNICAL FIELD

The present invention relates to a speech encoding apparatus, a speech decoding apparatus, a speech encoding method, and a speech decoding method having, for example, a scalable configuration.

BACKGROUND ART

In a mobile communication system, effective utilization of radio spectrum resources requires a speech signal to be compressed to a low bit rate before being transmitted. On the other hand, it is desired to improve the telephone speech quality and achieve a highly realistic communication service. In order to achieve such a communication service, it is desirable to perform high-quality encoding of a speech signal, a music signal, and the like with a broader frequency band.

A technique that hierarchically integrates a plurality of encoding techniques is regarded as promising for achieving these conflicting demands. This technique hierarchically combines a first layer that encodes an input signal up to a wide band (0 kHz to 7 kHz) and an extended band layer that encodes a super-wide band (7 kHz to 16 kHz) by using the input signal and the decoded signal of the first layer. Hereinafter, the frequency band encoded by the first layer (0 kHz to 7 kHz) is called the wide band part, and the frequency band encoded by the extended band layer (7 kHz to 16 kHz) is called the extended band part. FIG. 1 shows the wide band part and the extended band part in the input signal spectrum.

Because the technique performing such hierarchical encoding has scalability of a bit stream outputted from an encoding apparatus, that is, has the characteristic of being able to obtain a decoded signal from the information of even a part of the bit stream, it is generally referred to as scalable encoding (layer encoding).

Because of the nature of scalable encoding that enables flexible communication between networks having different bit rates, scalable encoding can be said to be suited for a future network environment, in which diverse networks are integrated by IP protocols.

An example of the implementation of scalable encoding using a technique that has been standardized by ITU-T (International Telecommunications Union Telecommunication Standardization Sector) is disclosed in Non-Patent Literature 1. This technique encodes a wide band signal in the first layer and performs encoding in an extended band layer by generating a signal of the extended band layer from a signal of the wide band layer. Using this type of scalable configuration can achieve high sound quality of decoded speech signal and a music signal which has a wider frequency band than a speech signal has.

In the case of an encoding system that encodes a signal up to a super-wide band to achieve high sound quality, because the frequency band of the signal is wide and the amount of encoding information is large, the bit rate becomes high. In wireless communication, because the bit rate allocated for speech communication is limited, there is a need to make the bit rate for speech communication as low as possible. In general, since the radio spectrum resources in wireless communication are limited, it is necessary to restrict the communication channel capacity on individual links. Therefore, the total bit rate for a speech codec is to be restricted to approximately 16 kbps.

CITATION LIST

Non-Patent Literature

NPL 1
Recommendation ITU-T G.718 Annex B, March, 2010

SUMMARY OF INVENTION

Technical Problem

In a related art apparatus, however, because a relatively high bit rate is required in encoding the wide band signal, it is only possible to allocate a very low bit rate for encoding the extended band signal. As a result, quantization noise can occur in the extended band part, resulting in the problem of overall sound quality degradation. If, however, the bit rate used for encoding of the wide band signal is decreased and the bit rate allocated for encoding of the extended band signal is increased, the sound quality of decoded wide band signal is degraded, which results in the problem of overall sound quality degradation. That is, when encoding of speech signal including a super-wide band signal is done at a low bit rate, there is a trade-off between the sound quality of the decoded wide band signal and the sound quality of the decoded extended band signal.

An object of the present invention is to provide a speech encoding apparatus, a speech decoding apparatus, a speech encoding method, and a speech decoding method capable of preventing a degradation of the overall sound quality of decoded signal even if the bit rate is made low.

Solution to Problem

A speech encoding apparatus according to an aspect of the present invention is an apparatus configured to encode a wide band signal in a first layer and to encode an extended band signal, whose frequency band is located in higher frequency than the wide band signal, in an extended band layer, the apparatus including: a band-selecting unit that selects a frequency band to which limiting is applied when encoding is performed in the extended band layer; and a band-limiting unit that applies the limiting to the selected frequency band of an input signal.

A speech decoding apparatus according to an aspect of the present invention is an apparatus configured to decode, in a first layer, first layer encoded information obtained by encoding a wide band signal in an encoding apparatus and to decode, in an extended band layer, extended band layer encoded information obtained by encoding an extended band signal whose frequency band is located in higher frequency than the wide band signal in the encoding apparatus, the decoding apparatus including: a band-selecting unit that selects a frequency band to which limiting is applied when outputting is performed in the extended band layer; and a band-limiting unit that applies the limiting to the selected frequency band of a decoded signal.

A speech encoding method according to an aspect of the present invention is a method for encoding a wide band signal in a first layer and for encoding an extended band signal whose frequency band is located in higher frequency than the wide band signal in an extended band layer, the method including: selecting a band to which limiting is applied when encoding is performed in the extended band layer; and applying the limiting to the selected frequency band of an input signal.

A speech decoding method according to an aspect of the present invention is a method for decoding a wide band signal in a first layer and for decoding an extended band signal whose frequency band is located in higher frequency than the wide band signal in an extended band layer, the method including: selecting a frequency band to which limiting is applied when outputting is performed in the extended band layer; and applying the limiting to the selected frequency band of a decoded signal.

Advantageous Effects of Invention

According to the present invention, it is possible to prevent the degradation of the overall quality associated with encoding, even if the bit rate is made low.

DESCRIPTION OF EMBODIMENTS

Embodiments of the present invention will be described in detail below, with references made to the drawings.

Embodiment 1

Speech Encoding Apparatus Configuration

Figure 1:
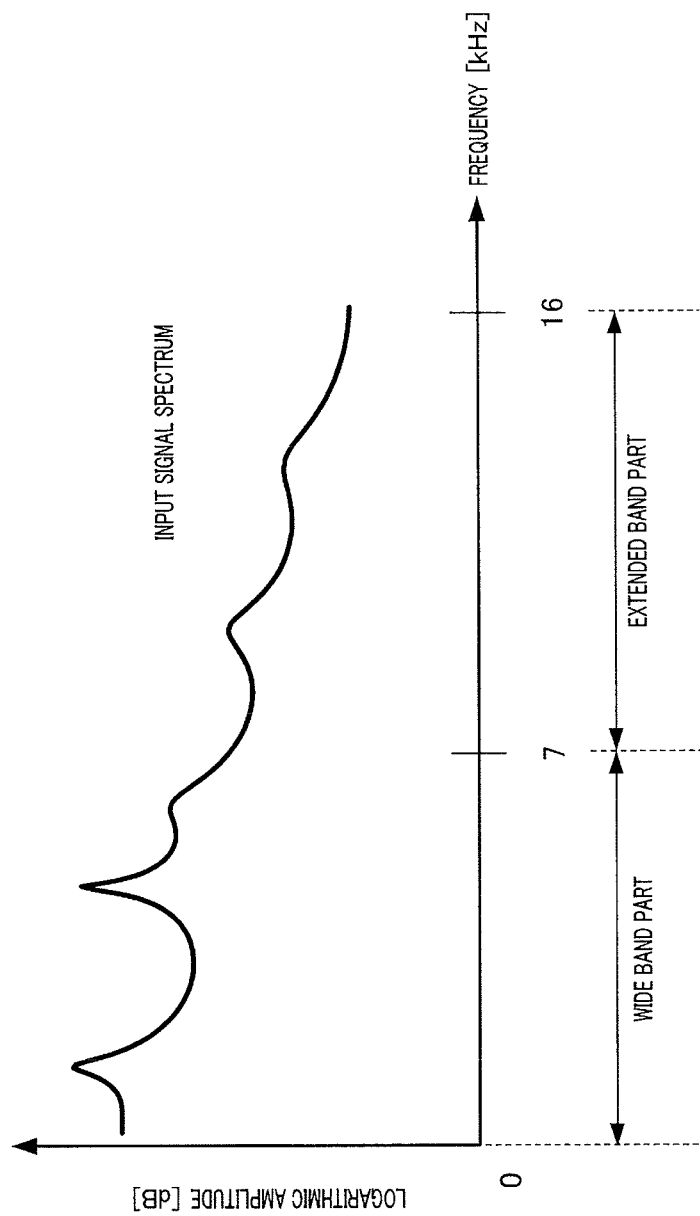
FIG. 1 shows a wide band part and an extended band part in an input signal spectrum.
Figure 2:
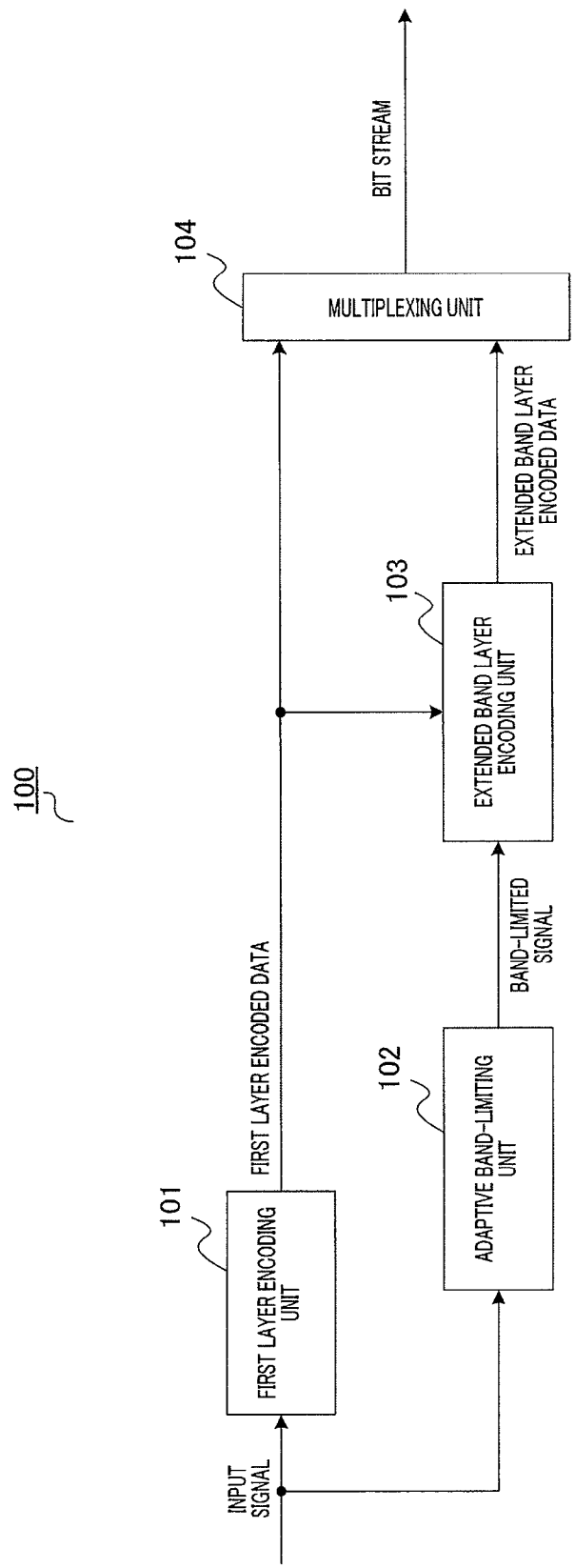
FIG. 2 is a block diagram showing the configuration of a speech encoding apparatus according to Embodiment 1 of the present invention.

FIG. 2 is a block diagram showing the configuration of speech encoding apparatus 100 according to Embodiment 1 of the present invention.

Speech encoding apparatus 100 generates a bit stream by performing encoding processing of an input signal in units of a prescribed time interval (frame), and transmits the generated bit stream to a non-illustrated transmission channel.

First layer encoding unit 101 performs encoding processing of the input signal in the first layer to generate first layer encoded data. First layer encoding unit 101 outputs the generated first layer encoded data to extended band layer encoding unit 103 and multiplexing unit 104.

Adaptive band-limiting unit 102 selects a frequency band to be limited, based on the pitch period of the input signal and, of the frequency band of the input signal of the extended band layer, applies limiting to the selected frequency band. Adaptive band-limiting unit 102 outputs the band-limited signal, whose selected frequency band is limited, to extended band layer encoding unit 103. In this case, the band that is to be limited is a band that is to be removed from the encoding target in the extended band layer, or the band in which the energy is to be attenuated in the extended band layer. Details of the configuration of adaptive band-limiting unit 102 will be described later.

Extended band layer encoding unit 103 uses first layer encoded data input from first layer encoding unit 101 and the band-limited signal input from adaptive band-limiting unit 102 to perform encoding processing of the extended band part in the extended band layer to generate extended band layer encoded data. Extended band layer encoding unit 103 outputs the generated extended band layer encoded data to multiplexing unit 104.

Multiplexing unit 104 multiplexes the first layer encoded data input from first layer encoding unit 101 and the extended band layer encoded data input from extended band layer encoding unit 103 to generate a bit stream, and outputs the generated bit stream to a non-illustrated transmission channel.

<Adaptive Band-Limiting Unit Configuration>

Figure 3:
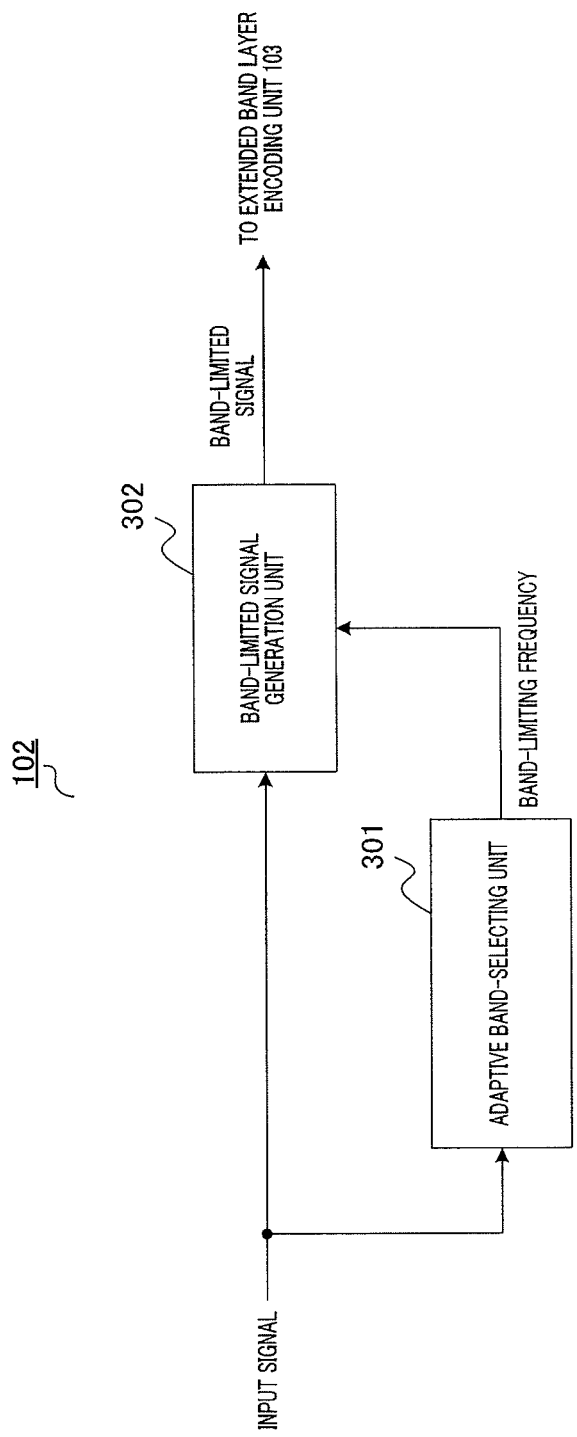
FIG. 3 is a block diagram showing the configuration of an adaptive band-limiting unit in Embodiment 1 of the present invention.

FIG. 3 is a block diagram showing the configuration of adaptive band-limiting unit 102 of the present embodiment.

Adaptive band-selecting unit 301 analyzes the characteristics of the input signal and selects a frequency band for limiting in the input signal, based on the analysis results. Adaptive band-selecting unit 301 outputs information of the selected frequency band for limiting to band-limited signal generation unit 302 as a band-limiting frequency. Details of the configuration of adaptive band-selecting unit 301 will be described later.

Band-limited signal generation unit 302 generates a band-limited signal based on the input signal and on the band-limiting frequency input from adaptive band-selecting unit 301, and outputs the generated band-limited signal to extended band layer encoding unit 103.

Specifically, band-limited signal generation unit 302 limits the band of the input signal, with frequencies below the band-limiting frequency input from adaptive band-selecting unit 301 as a passband. That is, band-limited signal generation unit 302 outputs the input signal below the band-limiting frequency selected by adaptive band-selecting unit 301 to extended band layer encoding unit 103 as the band-limited signal. In this case, band-limited signal generation unit 302 is constituted, for example, by a low-pass filter.

Also, band-limited signal generation unit 302, of the input signal, outputs to extended band layer encoding unit 103, as a band-limited signal, a signal in which the high-band energy above the band-limiting frequency input from adaptive band-selecting unit 301 is attenuated.

<Adaptive Band-Selecting Unit Configuration>

Figure 4:
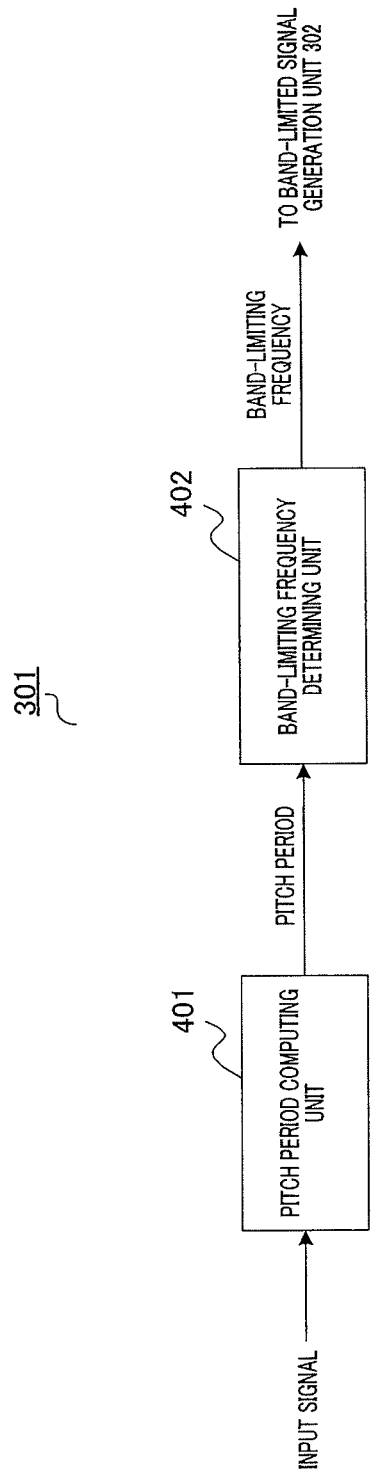
FIG. 4 is a block diagram showing the configuration of an adaptive band-selecting unit in Embodiment 1 of the present invention.

FIG. 4 is a block diagram showing the configuration of adaptive band-selecting unit 301 in the present embodiment.

Pitch period computing unit 401 computes the pitch period of the input signal and outputs the computed pitch period to band-limiting frequency determining unit 402.

Band-limiting frequency determining unit 402 determines the pitch frequency F0 represented by the inverse number of the pitch period, using the pitch period input from pitch period computing unit 401, and determines the band-limiting frequency Fcut, using the determined pitch frequency F0. The lower the pitch frequency F0 is, the higher the band-limiting frequency Fcut is set, and the higher the pitch frequency F0 is, the lower the band limiting frequency Fcut is set. Specifically, the band-limiting frequency Fcut is represented by the following Equation 1.

(Equation 1)

$$F_{cut} = \frac{\alpha}{F_0} \quad [1]$$

In Equation 1, α is a constant of proportionality.

Because speech having a short pitch period (high frequency) tends to include a relatively large amount of energy in the super-wide band part, there can be a noise when encoding is done in the extended band layer with a low bit rate. Therefore, in the case of speech with a short pitch period, the band-limiting frequency Fcut is set to lower than for the case of speech having a long pitch period (low frequency). In contrast, because speech having a long pitch period tends to have little energy in the super-wide band part compared to speech having a short pitch period, it is difficult to sense noise even if encoding is done in the extended band layer with a low bit rate. Therefore, in the case of speech having a long pitch period, the band-limiting frequency Fcut is set higher than the case of speech having a short pitch period (high frequency). By adaptively setting the band-limiting frequency Fcut in accordance with the pitch period in this manner, quantization noise occurring in the super-wide band part can be suppressed, and sound quality can be improved.

Band-limiting frequency determining unit 402 outputs the determined band-limiting frequency Fcut to band-limited signal generation unit 302. By doing this, band-limited signal generation unit 302 limits the frequency band so as not to pass a frequency band that is located in higher frequency than the band-limiting frequency Fcut. Alternatively, Band-limited signal generation unit 302 limits the frequency band by attenuating the energy in a frequency band that is located in higher frequency than the band-limiting frequency Fcut.

As described above, in the present embodiment, when encoding speech including a super-wide band signal is performed using a low bit rate, the frequency band of the signal input to the extended band layer is adaptively limited in accordance with the characteristics of the input signal, so as to reduce the quantization noise occurring in the extended band part. In general, the lower the frequency of a speech signal, the more important is the quality in terms of auditory perception, and, for example, in a frequency band of above 7 kHz, it is difficult to sense a subjective difference in the quality caused by a difference in the width of frequency band of the signal. Using this principal, if a judgment is made from the characteristics of the input signal that there is a tendency for quantization noise to occur in the extended band part, the bandwidth of the input signal is limited so as to reduce the feeling of noise on the output signal. When this is done, although the band limitation causes a feeling of loss of bandwidth, because it is difficult to sense a subjective difference in quality caused by a difference in bandwidth, the overall quality improves.

<Speech Decoding Apparatus Configuration>

Figure 5:
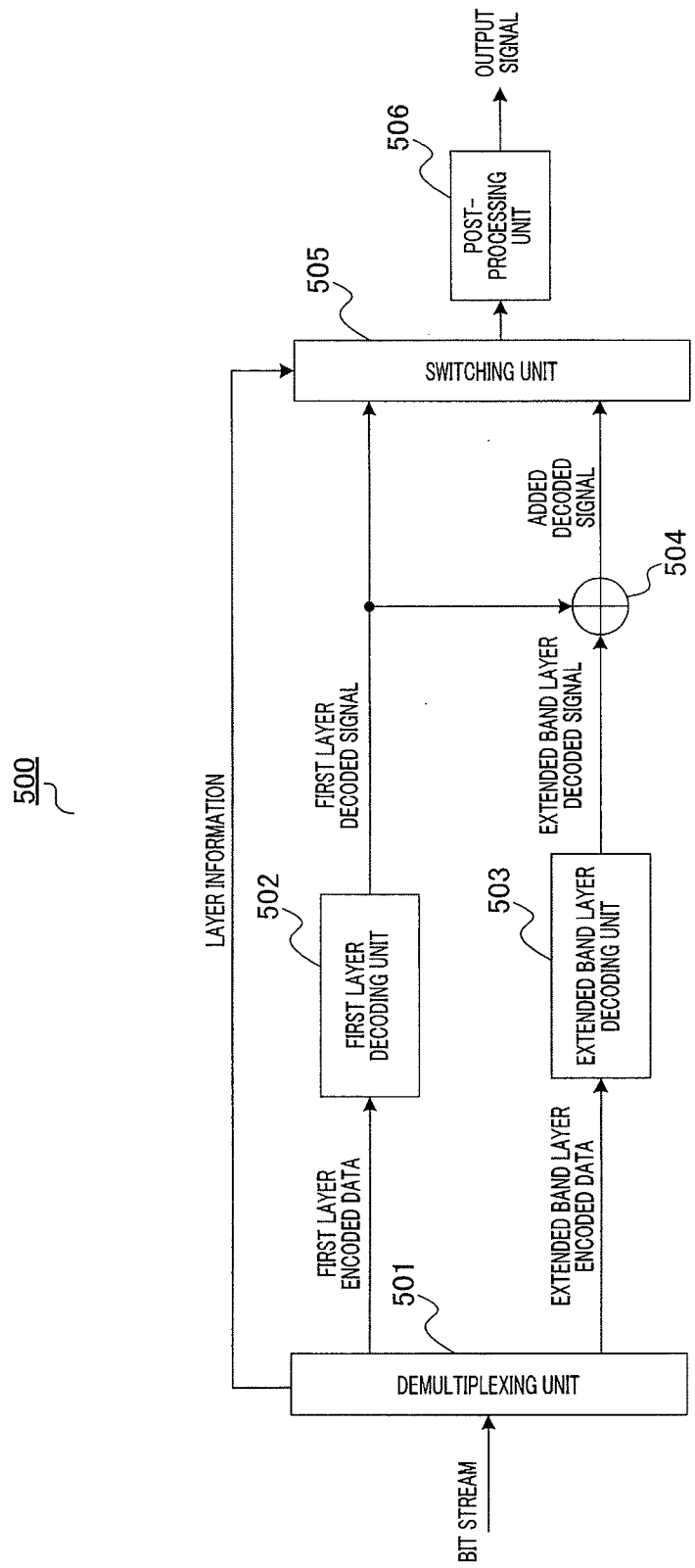
FIG. 5 is a block diagram showing the configuration of a speech decoding apparatus in Embodiment 1 of the present invention.

FIG. 5 is a block diagram showing the configuration of speech decoding apparatus 500 in Embodiment 1 of the present invention.

Demultiplexing unit 501 separates a bit stream input via a non-illustrated transmission channel into first layer encoded data and extended band layer encoded data, outputs the first layer encoded data to first layer decoding unit 502, and outputs the extended band layer encoded data to extended band layer decoding unit 503. There are cases, however, in which, depending upon the transmission channel condition, such as the occurrence of congestion, a part of the encoded data (for example, the extended band layer encoded data) or all of the encoded data is discarded. When this occurs, demultiplexing unit 501 judges whether the received encoded data includes only the first layer encoded data or the received encoded data includes both the first layer encoded data and the extended band layer encoded data, and outputs the judgment result to switching unit 505 as layer information. Layer information is, for example, 1 in the former case and 2 in the latter case. Speech decoding apparatus 500 generates an output signal by performing prescribed compensation processing in the case in which all the encoded data has been discarded.

First layer decoding unit 502 generates a first layer decoded signal by performing decoding processing of the first layer encoded data input from demultiplexing unit 501, and outputs the generated first layer decoded signal to adding unit 504 and switching unit 505.

Extended band layer decoding unit 503 performs decoding processing of the extended band layer encoded data input from demultiplexing unit 501 to generate an extended band layer decoded signal, and outputs the generated extended band layer decoded signal to adding unit 504.

Adding unit 504 adds the first layer decoded signal input from first layer decoding unit 502 and the extended band layer decoded signal input from extended band layer decoding unit 503 to generate an added decoded signal, and outputs the generated added decoded signal to switching unit 505.

Switching unit 505 references the layer information input from demultiplexing unit 501 and, if only first layer encoded data is included (for example, if the layer information is 1), outputs the first layer decoded signal as a decoded signal to post-processing unit 506. If switching unit 505 references the layer information input from demultiplexing unit 501 and both the first layer encoded data and the extended band layer encoded data are included (for example, if the layer information is 2), it outputs to post-processing unit 506 an added decoded signal from the adding unit 504, which is the sum of the first layer decoded signal and the extended band layer decoded signal, as the decoded signal.

Post-processing unit 506 performs post-processing such as post-filtering of the decoded signal input from switching unit 505 and outputs the result as the output signal.

Effect of the Present Embodiment

According to the present embodiment, the band-limiting frequency is adaptively adjusted in accordance with the pitch period, so that a frequency band that is located in higher frequency than the band-limiting frequency is removed from the encoding target in the extended band layer, or so that the energy in the band that is located in higher frequency than the band-limiting frequency is attenuated in the extended band layer to reduce its audible importance, thereby preventing a degradation of the overall quality associated with encoding using a low bit rate.

Variations of the Present Embodiment

Although the present embodiment simply encodes the input signal in first layer encoding unit 101, this is not a restriction on the present invention. A mode judgment may be made as to whether the input signal is speech or music, with mode judgment information being output to adaptive band-limiting unit 102, and adaptive band-limiting unit 102 switching between performing and not performing band-limiting, depending upon whether the input signal is speech or music. Specifically, switching may be done so that band-limiting is performed if the input signal is speech and band-limiting is not performed if the input signal is music.

Also, although in the present embodiment an equation is used by adaptive band-selecting unit 301 in determining the band-limiting frequency Fcut from the pitch frequency F0, this is not a restriction on the present invention, and the band-limiting frequency Fcut may be determined from the pitch frequency F0 by referencing a table. When doing this, the table is designed so that the Fcut becomes higher, the lower is the pitch frequency F0 of the input signal, and Fcut becomes lower, the higher is the pitch frequency F0 of the input signal.

Although the present embodiment limits the frequency band which is located in higher frequency than the band limiting frequency Fcut in the extended band part, this is not a restriction on the present invention, and band limitation may be done of a prescribed bandwidth that influences the quality in the extended band part.

Although in the present embodiment the pitch period of the input signal is computed by pitch period computing unit 401, this is not a restriction on the present invention, and the pitch period of the input signal may be computed in first layer encoding unit 101 and output to band-limiting frequency determining unit 402. In this case, it is possible to eliminate the need for pitch period computing unit 401.

Embodiment 2

A feature of the present embodiment is that it determines the spectrum by performing an FFT (Fast Fourier Transform) analysis of the input signal, and uses the determined spectrum and a threshold determined by the pitch frequency and the bit rate to determine the band-limiting frequency. The bit rate in this case is input from outside the speech encoding apparatus.

<Adaptive Band-Selecting Unit Configuration>

Figure 6:
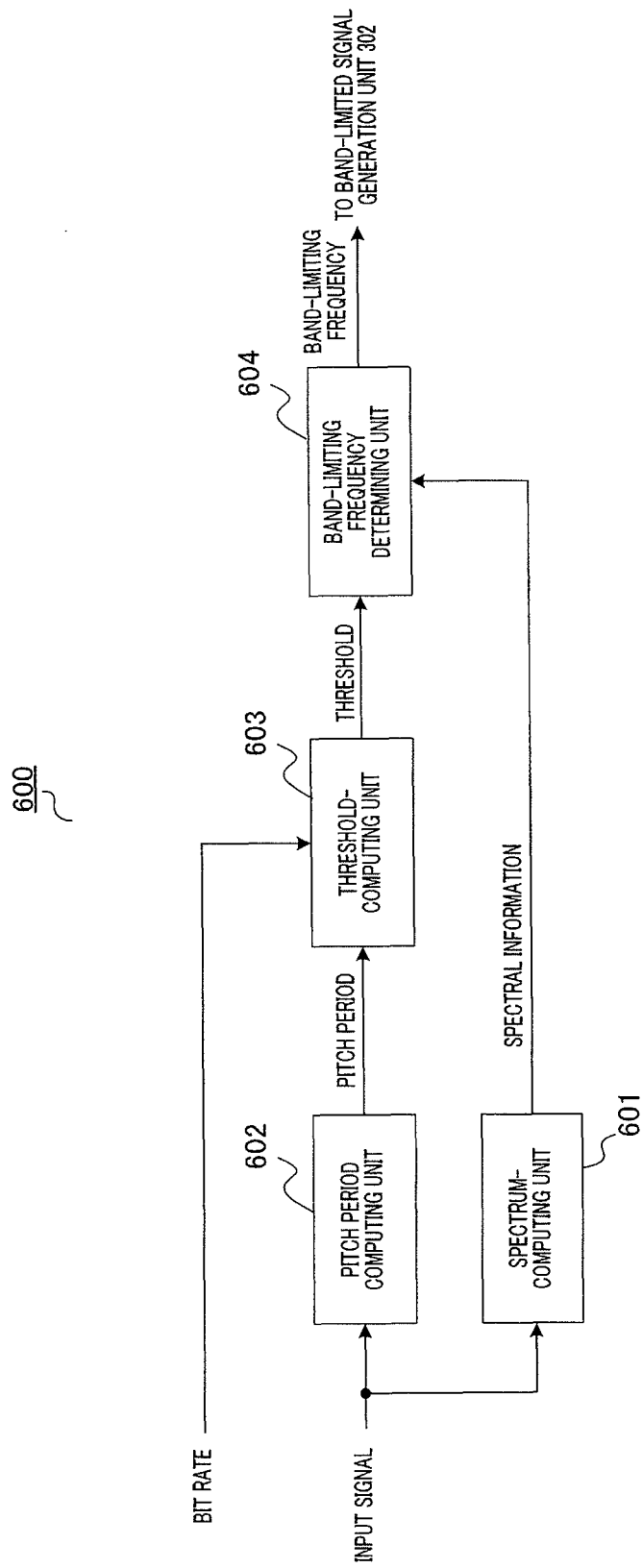
FIG. 6 is a block diagram showing the configuration of an adaptive band-selecting unit in Embodiment 2 of the present invention.

FIG. 6 is a block diagram showing the configuration of adaptive band-selecting unit 600 in Embodiment 2 of the present invention. Because the speech encoding apparatus in the present embodiment has the same configuration as that shown in FIG. 2, the description thereof will be omitted. Because the adaptive band-limiting unit in the present embodiment has the same configuration shown in FIG. 3, with the exception of having adaptive band-selecting unit 600 instead of adaptive band-selecting unit 301, the description thereof will be omitted. Also, because the speech decoding apparatus of the present embodiment has the same configuration as shown in FIG. 5, the description thereof will be omitted.

Spectrum-computing unit 601 computes the spectrum by performing an FFT analysis of the input signal and outputs spectral information of the computed spectrum to band-limiting frequency determining unit 604.

Pitch period computing unit 602 computes the pitch period of the input signal and outputs the computed pitch period to threshold-computing unit 603.

Threshold-computing unit 603 computes a threshold from the pitch period input from pitch period computing unit 602 and the input bit rate, and outputs the computed threshold Ith to band-limiting frequency determining unit 604. The bit rate is a pre-set value. The threshold Ith is determined by the following Equation 2.

(Equation 2)

$$I_{th} = \beta \cdot \frac{br}{F_0} \qquad [2]$$

In Equation 2, br is the bit rate, F0 is the pitch frequency, and β is a scaling coefficient.

In this case, the pitch frequency is represented by the inverse number of the pitch period input from pitch period computing unit 602. From Equation 2, it can be shown that the higher the bit rate is, the larger the threshold Ith becomes, and the higher the pitch frequency is, the smaller the threshold Ith becomes. The bit rate may be a bit rate allocated to the overall codec, or may be a bit rate allocated to only the extended band layer.

Band-limiting frequency determining unit 604 determines the band-limiting frequency, using the spectral information input from spectrum-computing unit 601 and the threshold input from threshold-computing unit 603, and outputs the determined band-limiting frequency to band-limited signal generation unit 302.

<Band-Limiting Frequency Determining Method>

Figure 7:
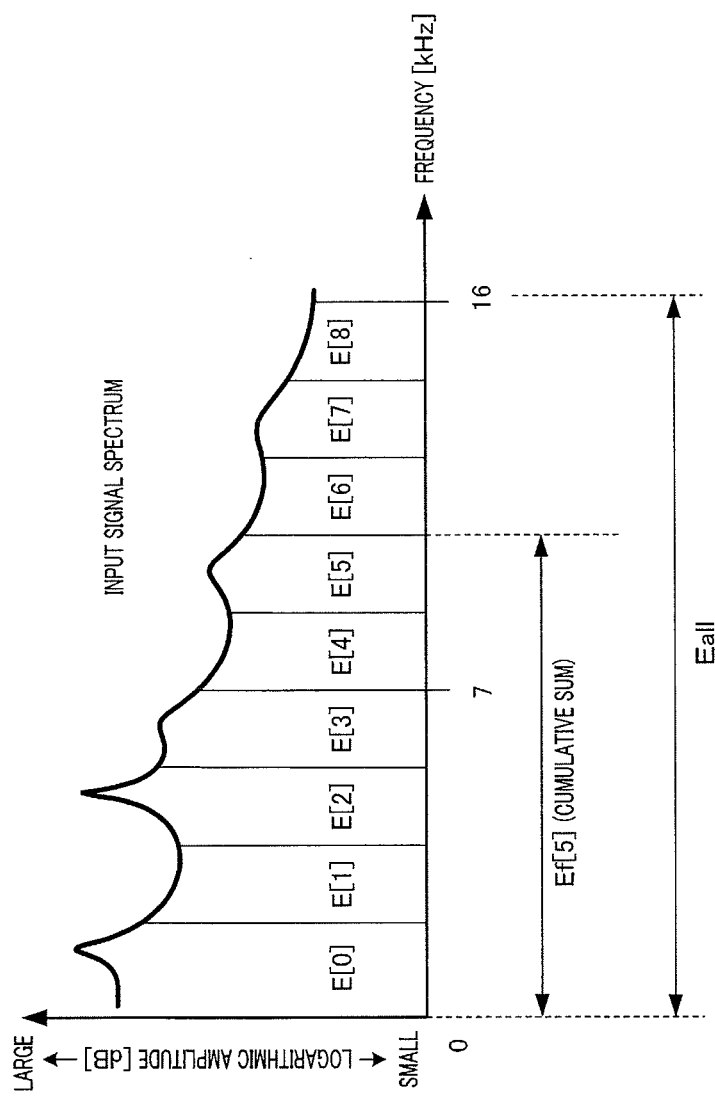
FIG. 7 shows a method of determining a band-limiting frequency in Embodiment 2 of the present invention.

FIG. 7 shows the method of determining the band-limiting frequency. FIG. 7 shows the case in which the super-wide band speech spectrum is divided in the nine sub-bands E[0] to E[8]. The super-wide band speech spectrum is not restricted to division into nine sub-bands, and may be divided into an arbitrary number of sub-bands. The bandwidths of each sub-band are not restricted to being equal widths, and may be different widths.

Band-limiting frequency determining unit 604 determines the sub-band energy ratio (Ef[k]/Eall) of the cumulative sum Ef[k] for sub-band energies E[k] from the low range with respect to the overall sum energy Eall of all sub-bands. In this case, k is the sub-band index represented by an integer in the range from 0 to 8. Band-limiting frequency determining unit 604 outputs to band-limited signal generation unit 302 the sub-band index k (k=5 in the case of FIG. 7) when the sub-band energy ratio reaches a value that is larger than the threshold Ith input from threshold-computing unit 603.

<Operation of Band-Limiting Frequency Determining Unit>

Figure 8:
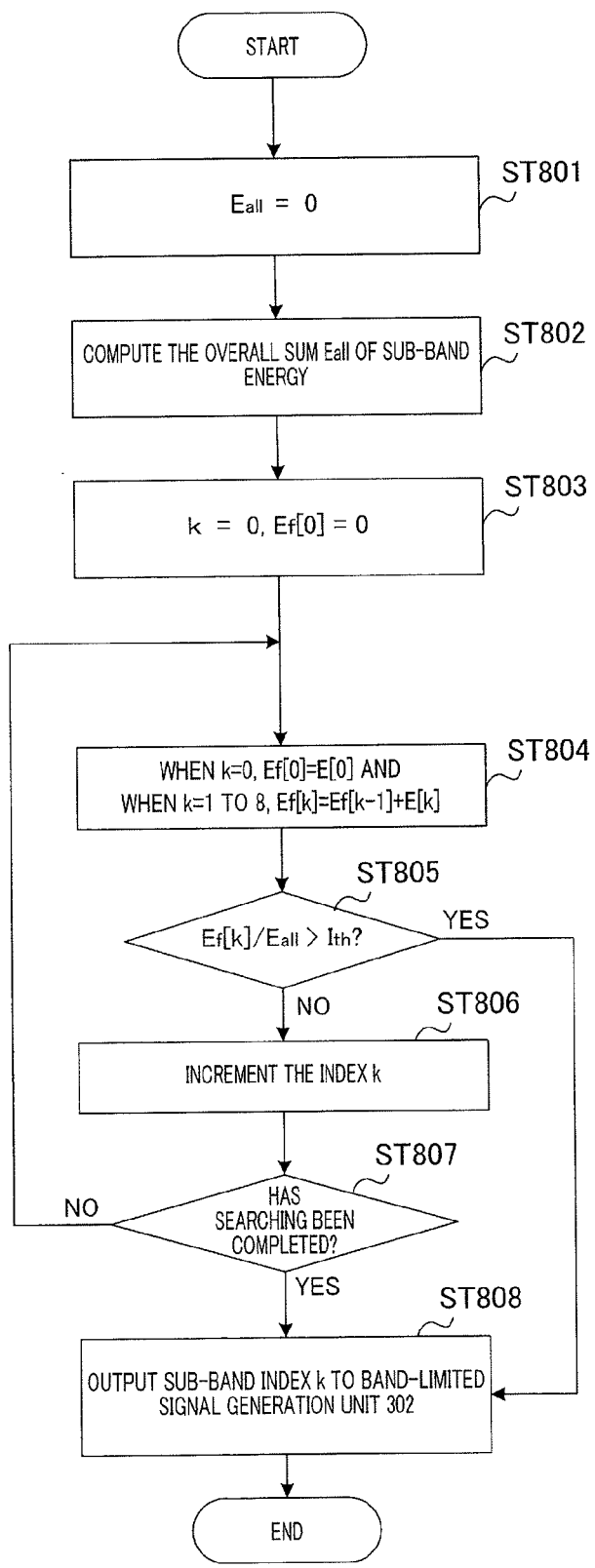
FIG. 8 is a flowchart showing the operation of a band-limiting frequency determining unit in Embodiment 2 of the present invention.

FIG. 8 is a flowchart showing the operation of band-limiting frequency determining unit 604.

Band-limiting frequency determining unit 604 first performs initialization by setting the overall sum energy Eall of all the sub-bands to zero (step ST801).

Next, band-limiting frequency determining unit 604 determines the overall sum energy Eall of all of the sub-bands (step ST802).

Next, band-limiting frequency determining unit 604 initializes the sub-band index k and the sub-band energy cumulative sum Ef[0] to zero in order to determine the cumulative sum Ef[k] of the sub-band energies (step ST803).

Next, band-limiting frequency determining unit 604 determines the sub-band energy cumulative sum Ef[k] for the sub-band index k (step ST804) and compares the sub-band energy ratio (Ef[k]/Eall) obtained using Ef[k] with the threshold Ith output from threshold-computing unit 603 (step ST805).

If the sub-band energy ratio is not greater than the threshold Ith (NO at step ST805), band-limiting frequency determining unit 604 increments the value of the sub-band index k (step ST806) and judges whether or not a prescribed range of searching has been completed (step ST807).

If the searching has not been completed (NO at step ST807), band-limiting frequency determining unit 604 repeats the processing of steps ST804 to ST807 until the sub-band energy ratio exceeds the threshold Ith.

If, however, the sub-band energy ratio exceeded the threshold Ith (YES at step ST805) or the prescribed range of searching has been completed (YES at step ST807), band-limiting frequency determining unit 604 outputs the sub-band index k at that time to band-limited signal generation unit 302 (step ST808). Each sub-band index k has a one-to-one correspondence to the upper-end frequency of that sub-band, and that upper-end frequency is taken to be the band-limiting frequency.

By setting the band-limiting frequency using the sub-band energy ratios in this manner, the present embodiment divides the overall frequency band into a plural of frequency bands that have relatively large energies and those that have relatively small energies, by either removing frequency bands having a small energy from the encoding target or attenuating the energy of frequency bands having a small energy, their audible importance is reduced.

Effect of the Present Embodiment

The present embodiment adaptively adjusts the band-limiting frequency in accordance with sub-band energy ratios to prevent degradation of the overall quality associated with encoding using a low bit rate.

Variations of the Present Embodiment

Although in the present embodiment spectrum-computing unit 601 computes the spectrum by performing an FFT analysis of the input signal, this is not a restriction on the present invention, and the spectral envelope may be determined using LPC (linear prediction coding) coefficients generated by the first layer encoding unit.

Figure 9:
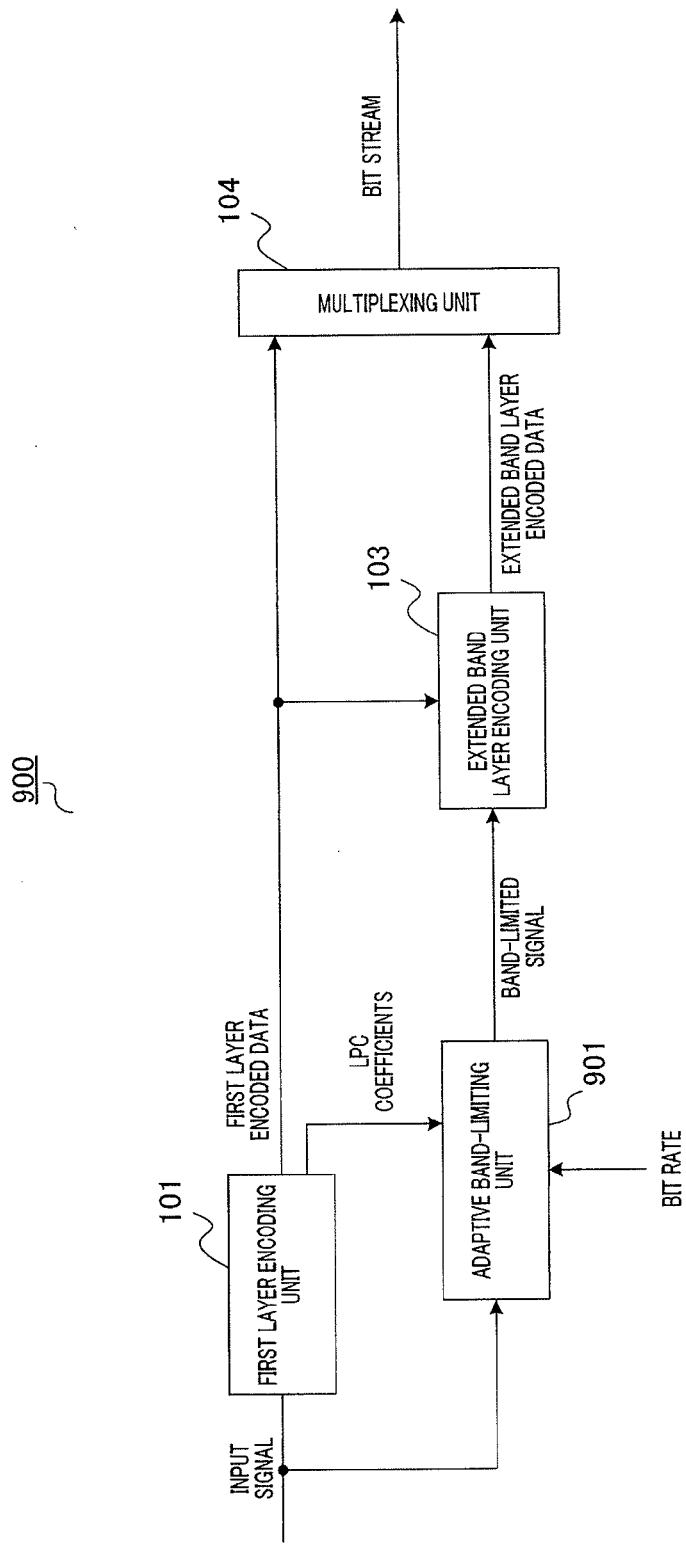
FIG. 9 is a block diagram showing a variation of a speech encoding apparatus according to Embodiment 2 of the present invention.

FIG. 9 is a block diagram showing a variation (speech encoding apparatus 900) of the speech encoding apparatus according to the present invention. Speech encoding apparatus 900 shown in FIG. 9, in contrast to speech encoding apparatus 100 of Embodiment 1 shown in FIG. 2, has adaptive band-limiting unit 901 instead of adaptive band-limiting unit 102. In FIG. 9, parts that are the same as elements in FIG. 2 are assigned the same reference signs, and the descriptions thereof will be omitted.

First layer encoding unit 101 performs encoding processing of the input signal to generate first layer encoded data. First layer encoding unit 101 outputs the generated first layer encoded data to extended band layer encoding unit 103 and multiplexing unit 104, and also outputs LPC coefficients generated by first layer encoding unit 101 to adaptive band-limiting unit 901. The LPC coefficients are, for example, computed by the method of auto-correlation.

Adaptive band-limiting unit 901 selects a frequency band to which limiting is applied in the extended band layer, based on the input signal and on the LPC coefficients input from first layer encoding unit 101. Adaptive band-limiting unit 901, of the band of the input signal, outputs to extended band layer encoding unit 103 a band-limited signal limited to the selected frequency band. Details of the configuration of adaptive band-limiting unit 901 will be described later.

Extended band layer encoding unit 103 performs encoding processing of the extended band part, using the first layer encoded data input from first layer encoding unit 101 and the band-limited signal input from adaptive band-limiting unit 901, and generates extended band layer encoded data. Extended band layer encoding unit 103 outputs the generated extended band layer encoded data to multiplexing unit 104.

Figure 10:
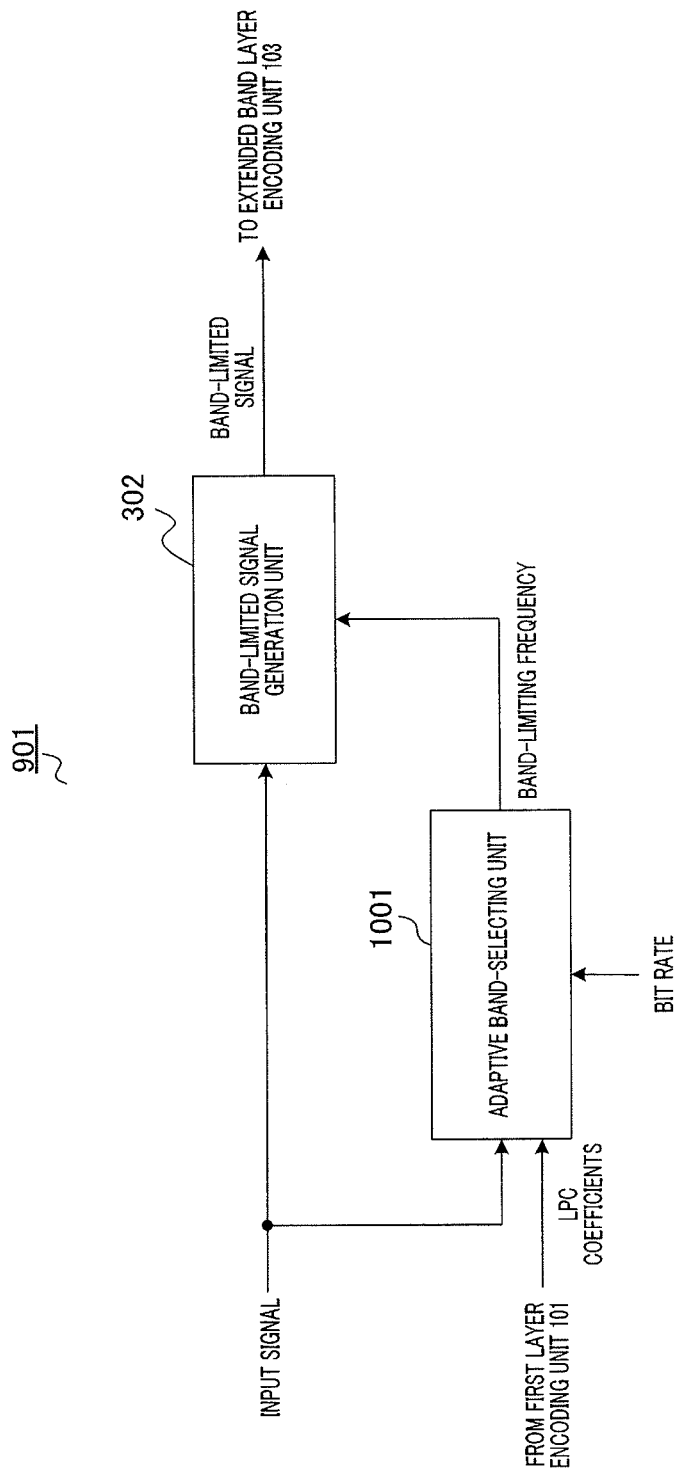
FIG. 10 is a block diagram showing the configuration of an adaptive band-limiting unit in a variation of Embodiment 2 of the present invention.

FIG. 10 is a block diagram showing the configuration of adaptive band-limiting unit 901. Adaptive band-limiting unit 901 shown in FIG. 10, in comparison with adaptive band-limiting unit 102 of Embodiment 1 shown in FIG. 3, has adaptive band-selecting unit 1001 instead of adaptive band-selecting unit 301. In FIG. 10, parts that are the same as those in FIG. 3 are assigned the same reference signs, and the descriptions thereof will be omitted. Details of the configuration of adaptive band-selecting unit 1001 will be described later.

Adaptive band-selecting unit 1001 analyzes the characteristics of the input signal and selects a frequency band of the input signal to which limiting is to be applied, based on the analysis results and on the LPC coefficients input from first layer encoding unit 101. Adaptive band-selecting unit 1001 outputs information of the band selected for limiting to band-limited signal generation unit 302 as the band-limiting frequency. The details of the configuration of adaptive band-selecting unit 1001 will be described later.

Band-limited signal generation unit 302 generates a band-limited signal, based on the input signal and on the band-limiting frequency input from adaptive band-selecting unit 1001 and outputs the generated band-limited signal to extended band layer encoding unit 103. Because the configuration and operation of band-limited signal generation unit 302 in the present embodiment are the same as those of band-limited signal generation unit 302 of Embodiment 1 described above, the detailed descriptions thereof will be omitted.

Figure 11:
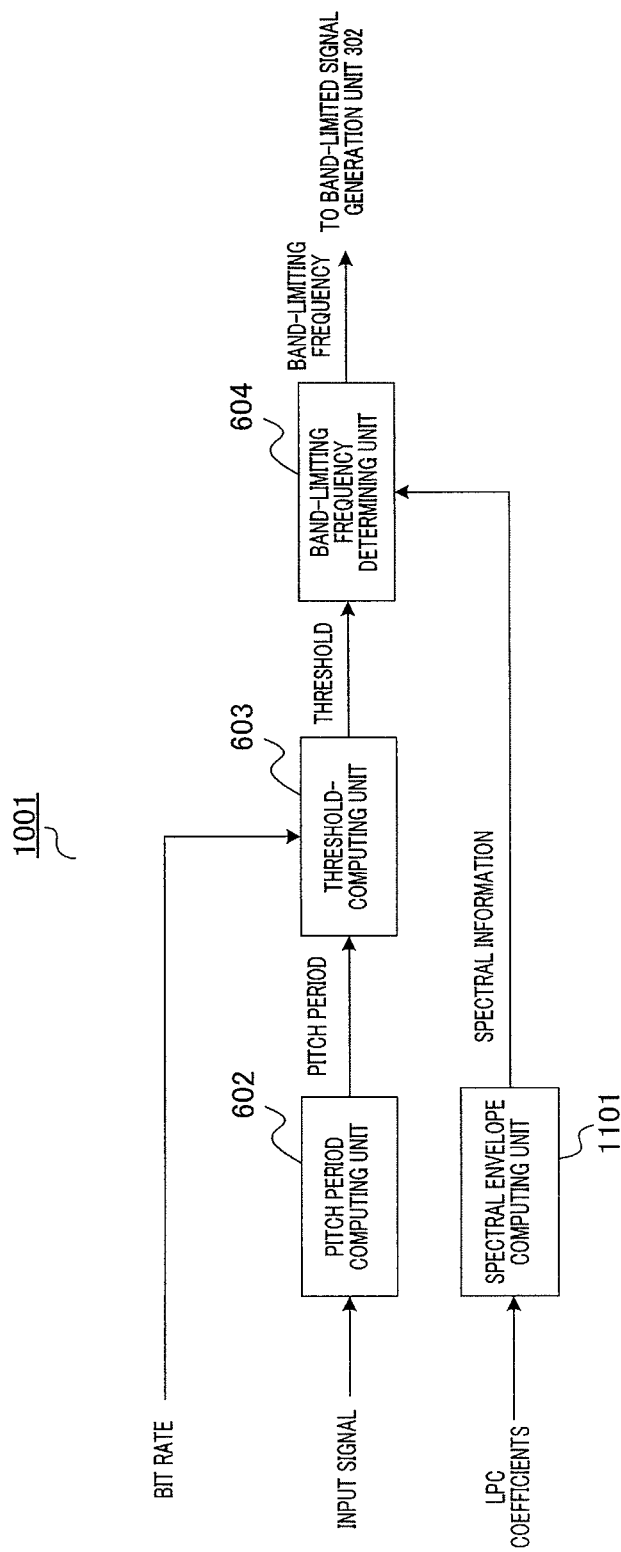
FIG. 11 is a block diagram showing the configuration of an adaptive band-selecting unit in a variation of Embodiment 2 of the present invention.

FIG. 11 is a block diagram showing the configuration of adaptive band-selecting unit 1001 in the present embodiment. In adaptive band-selecting unit 1001 shown in FIG. 11, in comparison with adaptive band-selecting unit 600 in the present embodiment shown in FIG. 6, spectrum-computing unit 601 is eliminated, and spectral envelope computing unit 1101 is added. In FIG. 11, parts that are the same as elements in FIG. 6 are assigned the same reference signs, and the descriptions thereof will be omitted.

Spectral envelope computing unit 1101 estimates the spectral envelope, using the LPC coefficients input from first layer encoding unit 101, and outputs the estimated spectral envelope as spectral information to band-limiting frequency determining unit 604. Band-limiting frequency determining unit 604, similar to the case of determining the spectrum by FFT analysis, may determine the sub-band energy ratios based on this spectral information.

The above-noted configuration can achieve the same effect as the effect of the present embodiment.

Although spectral envelope computing unit 1101 in the variation of the present embodiment determines the spectral envelope using LPC coefficients, this is not a restriction on the present invention, and the spectral envelope may be determined by a method other than LPC coefficients, such as LSP (linear spectral pairs), LSF (linear spectral frequencies), ISP (immitance spectral pairs), ISF (immitance spectral frequencies), or PARCOR (partial auto-correlation) coefficients.

Other Variations of the Present Embodiment

Although the spectrum-computing unit in the present embodiment computes the spectrum by performing FFT analysis of the input signal, this is not a restriction on the present invention, and use may be made of a method other than FFT, such as DFT (discrete Fourier transform), DCT (discrete cosine transform), MDCT (modified discrete cosine transform), or a filter bank.

Also, the present embodiment computes the pitch period of the input signal by the pitch period computing unit 602, this is not a restriction on the present invention, and the pitch period of the input signal may be computed in first layer encoding unit 101 and output to threshold-computing unit 603. In this case, pitch period computing unit 602 is not required.

Embodiment 3

A feature of the present embodiment is that it performs band-limiting based on a comparison of a background noise spectrum in an unvoiced period and a speech spectrum in a voiced period, so as to remove a limited band from the encoding target. That is, it determines the background noise spectrum in an unvoiced period and determines the speech spectrum in a speech period. In a voiced period, because the speech spectrum in a band that is below the level of the background noise is masked by the background noise and can be treated as being audibly unimportant, the band that is below this background noise level is limited.

<Adaptive Band-Selecting Unit Configuration>

Figure 12:
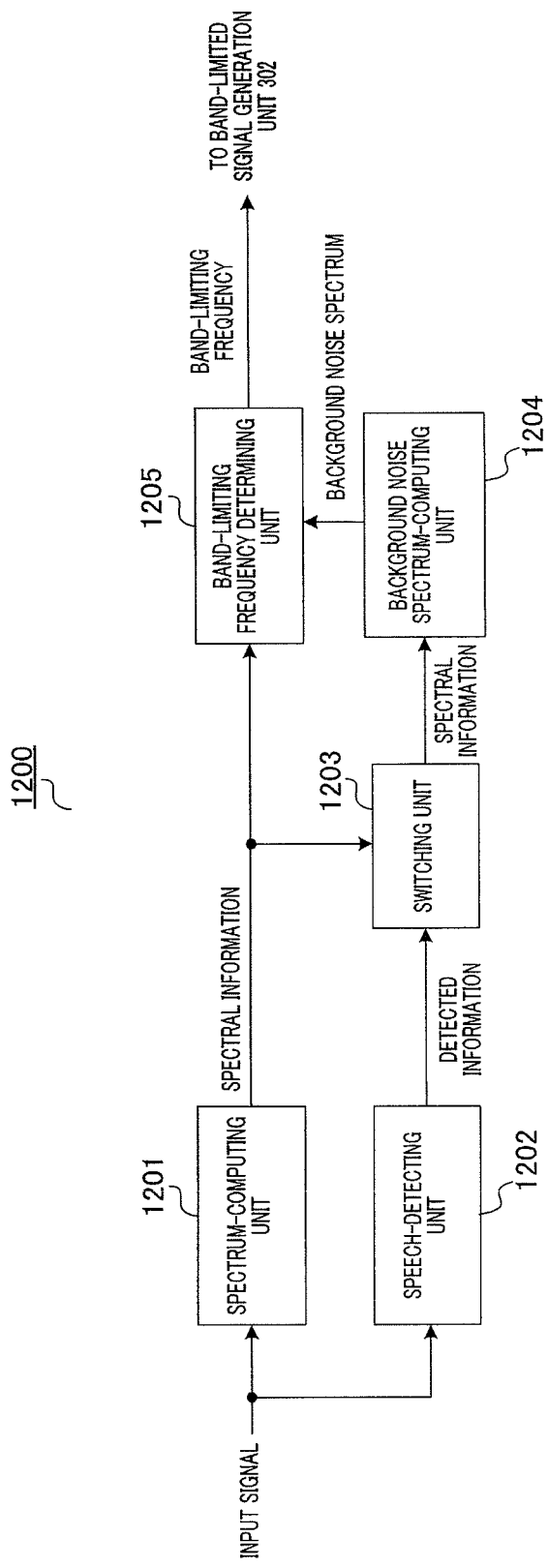
FIG. 12 is a block diagram showing the configuration of an adaptive band-selecting unit in Embodiment 3 of the present invention.

FIG. 12 is a block diagram showing the configuration of adaptive band-selecting unit 1200 in Embodiment 3 of the present invention. Because the configuration of the speech encoding apparatus in the present embodiment is the same as in FIG. 2, the description thereof will be omitted. Also, because, with the exception of having adaptive band-selecting unit 1200 instead of adaptive band-selecting unit 301, the configuration of adaptive band-limiting unit 102 in the present embodiment is the same as in FIG. 4, the description thereof will be omitted. Additionally, because the configuration of the speech decoding apparatus in the present embodiment is the same as in FIG. 5, the description thereof will be omitted.

Spectrum-computing unit 1201 determines the spectrum of the input signal by performing FFT analysis of the input signal and outputs spectral information of the determined spectrum to switching unit 1203 and band-limiting frequency determining unit 1205.

Speech-detecting unit 1202 uses the input signal to detect whether it is an unvoiced period or a voiced period, and outputs the detected information to switching unit 1203. Speech-detecting unit 1202, for example, outputs 0 for an unvoiced period and 1 for a voiced period as the detected information to switching unit 1203.

Switching unit 1203 performs switching using the detected information input from speech-detecting unit 1202. Specifically, switching unit 1203 outputs the spectral information input from spectrum-computing unit 1201 to background noise spectrum-computing unit 1204 only when the detected information indicates an unvoiced period (for example, when the detected information is 0). If the detected information indicates a voiced period (for example, when the detected information is 1), however, switching unit 1203 sets the switch to off and outputs nothing.

During a frame of an unvoiced period, background noise spectrum-computing unit 1204 takes the average of the sub-band energy in the spectral information input from switching unit 1203 for each sub-band and outputs the average background noise spectrum for each sub-band to band-limiting frequency determining unit 1205. The averaging of the background noise spectrum is done, for example, by the following Equation 3.

[3]

$$N_e[k] = \gamma \cdot S[k] + (1-\gamma) \cdot N_{prev}[k] \qquad (3)$$

In Equation 3, Ne is the average sub-band energy value of the estimated background noise spectrum, S is the energy of the input spectrum, Nprev is the average sub-band energy value determined from the background noise spectrum up until the previous frame, k is the sub-band index, and $\gamma$ is a coefficient ($0 \leq \gamma \leq 1$).

In Equation 3, when determining Ne in the frame of the next unvoiced period, Nprev is updated by substituting Ne in the previous frame into Nprev.

Band-limiting frequency determining unit 1205 subtracts the averaged background noise spectrum Ne input from the background noise spectrum-computing unit 1204 from the spectrum S of the spectrum information input from spectrum-computing unit 1201 for each sub-band in the logarithmic domain. Band-limiting frequency determining unit 1205 outputs the value of the frequency at which the value resulting from the subtraction becomes negative as the band-limiting frequency Fcut to band-limited signal generation unit 302. If the value resulting from the subtraction does not become negative, band-limiting frequency determining unit 1205 sets the value of the band limiting frequency Fcut to 16 kHz and outputs it to band-limited signal generation unit 302. That is, no band limitation is performed.

<Band-Limiting Frequency Determining Method>

FIGS. 13A to 13D show the method of determining the band-limiting frequency in the present embodiment.

Figures 13A, 13B, 13C, 13D:
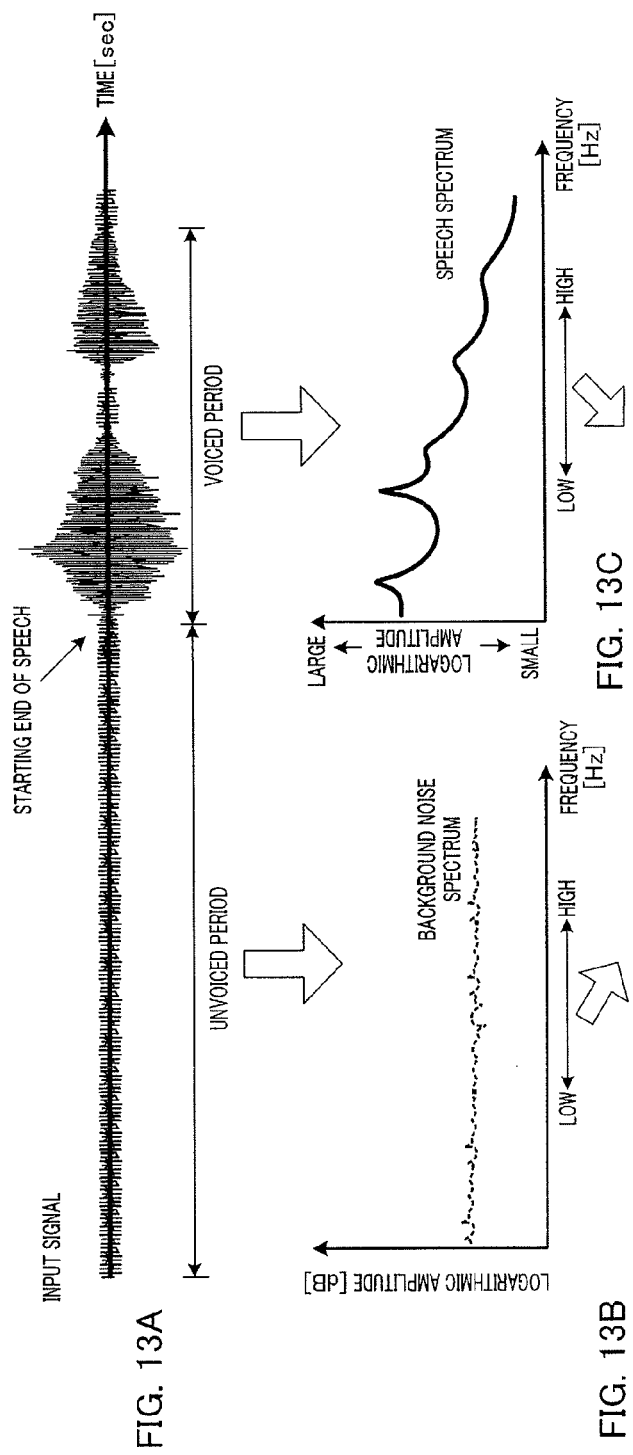
FIGS. 13A to 13D show a method of determining a band-limiting frequency in Embodiment 3 of the present invention.

Band-limiting frequency determining unit 1205 detects an unvoiced period and a voiced period from the input signal shown in FIG. 13A and obtains the background noise spectrum shown in FIG. 13B by performing FFT analysis of the input signal in the unvoiced period.

Band-limiting frequency determining unit 1205 also obtains the speech spectrum shown in FIG. 13C by performing FFT analysis of the input signal in the voiced period.

As shown in FIG. 13D, band-limiting frequency determining unit 1205 compares the spectrum shown in FIG. 13B with the spectrum shown in FIG. 13C. Band-limited signal generation unit 302 applies band limiting either by removing a band in which the speech spectrum is lower than the level of the background noise spectrum (the band above Fcut in FIG. 13D) from the encoding target, or by attenuating the energy of a band in which the speech spectrum is lower than the level of the background noise spectrum (the band above Fcut in FIG. 13D).

Effect of the Present Embodiment

The present embodiment adaptively adjusts the band-limiting frequency in accordance with the relationship of the speech spectrum level and the background noise spectrum level, thereby preventing a degradation of the overall quality associated with encoding using a low bit rate.

Variations of the Present Embodiment

Although in the present embodiment, the spectrum-computing unit computes the spectrum by performing FFT analysis of the input signal, this is not a restriction on the present invention, use may be made of a method other than FFT, such as DFT, DCT, MDCT, or a filter bank.

Variations Common to Embodiment 1 to Embodiment 3

Figure 14:
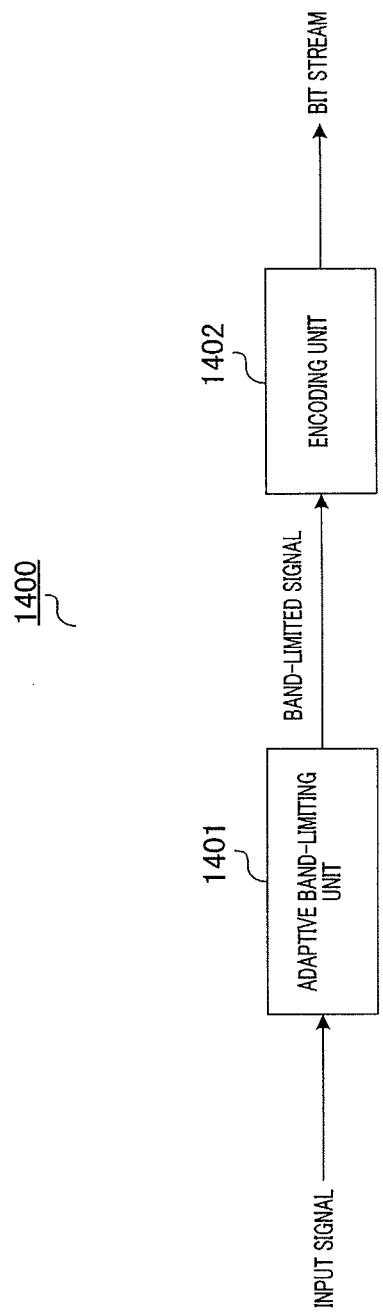
FIG. 14 is a block diagram showing the configuration of a speech encoding apparatus that does not have a scalable configuration.

Although the foregoing Embodiment 1 to Embodiment 3 have been described as speech encoding apparatuses having scalable configurations, this is not a restriction on the present invention, and application may be made to an encoding system that does not have a scalable configuration. FIG. 14 is a block diagram showing the configuration of speech encoding apparatus 1400 that does not have a scalable configuration. The present invention may be applied also to speech encoding apparatus 1400 such as shown in FIG. 14.

Referring to FIG. 14, adaptive band-limiting unit 1401 selects a frequency band to be limited in the extended band layer and outputs to encoding unit 1402 a band-limited signal, in which the selected frequency band of the input signal is limited. Adaptive band-limiting unit 1401 may adopt any of the methods shown in the above-noted Embodiment 1 to Embodiment 3 to determine the band-limiting frequency. In this case, for example, if the encoding target of encoding unit 1402 is a narrow band (0 Hz to 3.5 kHz), the lower limit of the band-limiting frequency determined by adaptive band-limiting unit 1401 may take on a value up to 3.5 kHz.

Encoding unit 1402 encodes the band-limited signal input from adaptive band-limiting unit 1401 to generate a bit stream and outputs the generated bit stream to a non-illustrated transmission channel.

Embodiment 4

A feature of the present embodiment is that it applies limiting to the band in the speech decoding apparatus.

Figure 15:
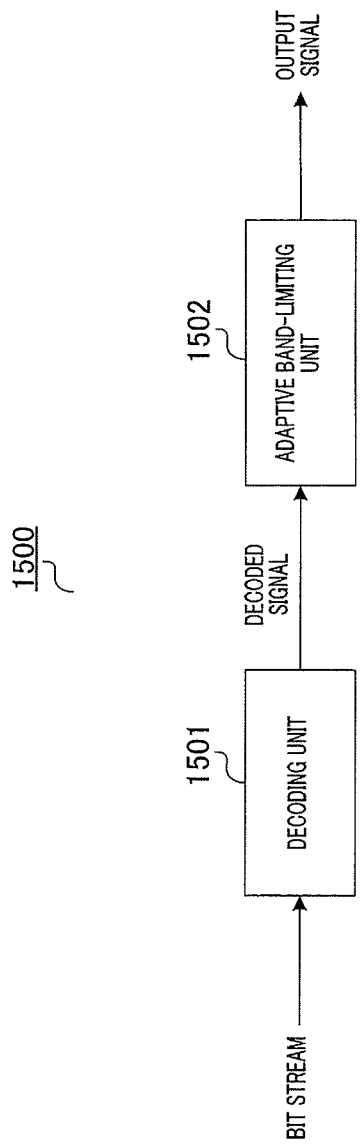
FIG. 15 is a block diagram showing the configuration of a speech decoding apparatus according to Embodiment 4 of the present invention.

FIG. 15 is a block diagram showing the configuration of speech decoding apparatus 1500 according to the present embodiment.

Decoding unit 1501 decodes the bit stream input via a non-illustrated transmission channel to generate a decoded signal and outputs the generated decoded signal to adaptive band-limiting unit 1502. Decoding unit 1501 in the present embodiment may have, for example, the same configuration as speech decoding apparatus 500 shown in FIG. 5, and in this case the detailed description thereof will be omitted.

Adaptive band-limiting unit 1502 selects a frequency band to be limited, and outputs as an output signal a signal in which the selected frequency band of the band of the decoded signal input from decoding unit 1501 has been limited. In this case, adaptive band-limiting unit 1502 adopts any one of the methods shown in the above-noted Embodiment 1 to Embodiment 3 to determine the band-limiting frequency.

That is, adaptive band-limiting unit 1502 selects a frequency band that is to be limited, based on the pitch period of the decoded signal input from decoding unit 1501. Adaptive band-limiting unit 1502 performs FFT analysis of the decoded signal input from decoding unit 1501 to compute the spectrum and uses the computed spectrum and the threshold determined by Equation 2 to select the band to be limited. Adaptive band-limiting unit 1502 performs FFT analysis of the decoded signal input from decoding unit 1501 to compute the spectrum, subtracts the average background noise spectrum from the spectra that are computed for each sub-band in the logarithmic domain, and selects frequencies above the frequency at which the value resulting from the subtraction becomes negative as the band for limiting.

That is, as in the encoding apparatus of the above-described embodiment, adaptive band-limiting unit 1502 may be configured to select a band to be removed that is wider, the higher is the pitch frequency or configured, in the case of an encoding apparatus with a scalable configuration, to select a band for attenuation of the wide band energy that is wider, the higher is the pitch frequency.

For example, if decoding subject of decoding unit 1501 is a narrow band (0 Hz to 3.5 kHz), adaptive band-limiting unit 1502 can take on values up to 3.5 kHz as the lower limit of the band-limiting frequency.

Effect of the Present Embodiment

The speech decoding apparatus according to the present embodiment adaptively adjusts the band-limiting frequency, either by removing a band greater than the band-limiting frequency from the encoding target in the extended band layer or by attenuating the energy thereof in the extended band layer so as to lower the audible importance thereof, thereby preventing a degradation of the overall quality associated with encoding using a low bit rate.

Variations of the Present Embodiment

Figure 16:
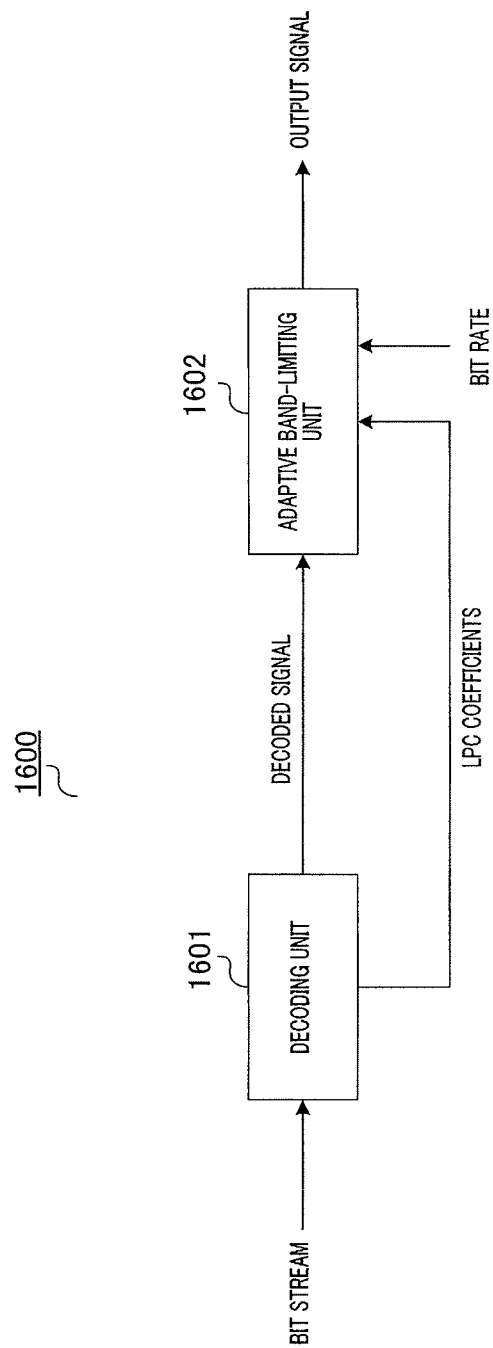
FIG. 16 is a block diagram showing the configuration of a speech decoding apparatus according to a variation of Embodiment 4 of the present invention.

FIG. 16 is a block diagram showing the configuration of speech decoding apparatus 1600 according to a variation of the present embodiment.

Speech decoding apparatus 1600 in the variation of the present embodiment determines the band-limiting frequency in adaptive band-limiting unit 1602 using the method of the above-noted Embodiment 2. In this case, LPC coefficients generated by decoding unit 1601 are used.

Decoding unit 1601 decodes a bit stream input via a non-illustrated transmission channel to generate a decoded signal and outputs the generated decoded signal to adaptive band-limiting unit 1602. When this is done, decoding unit 1601 generates LPC coefficients and outputs the generated LPC coefficients to adaptive band-limiting unit 1602. The LPC coefficients are, for example, computed by the method of auto-correlation. Because the other configuration elements and the operation of decoding unit 1601 are the same as those of speech decoding apparatus 500 of FIG. 5, the descriptions thereof will be omitted.

Adaptive band-limiting unit 1602 selects the band to be limited, based on the decoded signal and the LPC coefficients input from decoding unit 1601, and applies limiting to the selected frequency band of the decoded signal of the extended band layer input from decoding unit 1601. Adaptive band-limiting unit 1602 then outputs the band-limited signal, in which the selected frequency band is limited, as the output signal.

Figure 17:
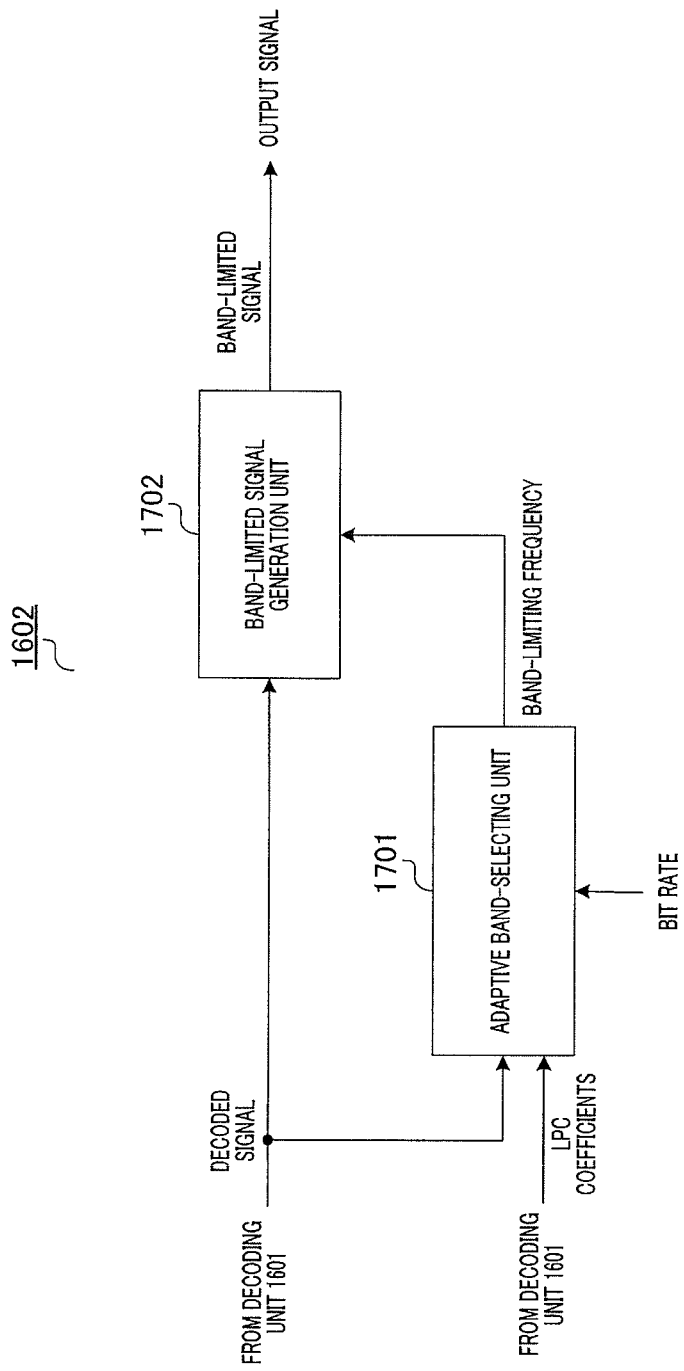
FIG. 17 is a block diagram showing the configuration of an adaptive band-limiting unit in a variation of Embodiment 4 of the present invention.

FIG. 17 is a block diagram showing the configuration of adaptive band-limiting unit 1602 in the variation of the present embodiment.

Adaptive band-selecting unit 1701 analyzes the characteristics of the decoded signal input from decoding unit 1601 and selects a frequency band of the decoded signal to be limited, based on the analysis results and on the LPC coefficients input from decoding unit 1601. Adaptive band-selecting unit 1701 outputs as the band-limiting frequency to band-limited signal generation unit 1702 information of the band selected for limiting.

Band-limited signal generation unit 1702 generates a band-limited signal, based on the decoded signal input from decoding unit 1601 and the band-limiting frequency input from adaptive band-selecting unit 1701, and outputs the generated band-limited signal as the output signal.

Specifically, band-limited signal generation unit 1702 limits the band of the decoded signal input from decoding unit 1601, with frequencies below the band-limiting frequency input from adaptive band-selecting unit 1701 as a passband. That is, band-limited signal generation unit 1702 outputs the input signal below the band-limiting frequency selected by adaptive band-selecting unit 1701 as the output signal (band-limited signal). In this case, band-limited signal generation unit 1702 is configured, for example, by a low-pass filter.

Also, of the input signal, band-limited signal generation unit 1702 outputs as an output signal (band-limited signal) a signal in which the high-band energy above the band-limiting frequency input from the adaptive band-selecting unit 1701 has been attenuated.

This variation achieves the same effect as that of the above-noted Embodiment 2.

Variations of the present embodiment are not restricted to the case of decoding unit 1601 having a scalable configuration, and application may be made as well to a configuration other than a scalable configuration.

Variation Common to All Embodiments

Although the above-described Embodiments 1 to 4 have scalable configurations with two layers, this is not a restriction on the present invention, and the present invention is applicable also to scalable configurations having three or more layers.

Additionally, in the above-noted Embodiment 1 to Embodiment 4, the input signal may be a speech signal, a music signal, or a signal that is a mixture of speech and music.

In Embodiments 1 to 4, the present invention is described using a case where the present invention is implemented as hardware. However, the present invention can be achieved through software in concert with hardware.

The functional blocks described in the embodiments are achieved by an LSI, which is typically an integrated circuit. The functional blocks may be provided as individual chips, or part or all of the functional blocks may be provided as a single chip. Depending on the level of integration, the LSI may be referred to as an IC, a system LSI, a super LSI, or an ultra LSI.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

The disclosures of Japanese Patent Applications No. 2011-129428, filed on Jun. 9, 2011 and No. 2011-172393, filed on Aug. 5, 2011, including the specifications, drawings and abstracts, are incorporated herein by reference in their entirety.

INDUSTRIAL APPLICABILITY

The present invention is suitable for use as a speech encoding apparatus, a speech decoding apparatus, a speech encoding method, and a speech decoding method having, for example, a scalable configuration.

REFERENCE SIGNS LIST

101 First layer encoding unit
102, 901, 1401, 1502, 1602 Adaptive band-limiting unit
103 Extended band layer encoding unit
104 Multiplexing unit
301, 600, 1001, 1701 Adaptive band-selecting unit
302, 1702 Band-limited signal generation unit
401, 602 Pitch period computing unit
402, 604, 1205 Band-limiting frequency determining unit
601, 1201 Spectrum-computing unit
603 Threshold-computing unit
1101 Spectral envelope computing unit
1202 Speech-detecting unit
1203 Switching unit
1204 Background noise spectrum-computing unit
1402 Encoding unit
1501, 1601 Decoding unit

The invention claimed is:

1. A speech encoding apparatus configured to encode a wide band signal of an input speech signal in a first layer and to encode an extended band signal of the input speech signal, whose frequency band is located in higher frequency than the wide band signal, in an extended band layer, the apparatus comprising:

a band-selector that selects, as a frequency band to which a limiting is applied, a frequency band to be removed from an encoding target in the extended band layer when encoding is performed in the extended band layer; and a band-limiter that applies the limiting to the selected frequency band of the input speech signal by removing the selected frequency band from the encoding target, wherein:

the band-selector selects the frequency band to be removed in correlation with a pitch frequency of the input speech signal, such that the higher the pitch frequency of the input speech signal the wider the frequency band to be removed;

each of the band-selector and the band-limiter is included in at least one processor, and the input speech signal is encoded by the at least one processor in accordance with the selecting by the band-selector and the limiting by the band-limiter.

2. A speech decoding apparatus configured to decode, in a first layer, first layer encoded information obtained by encoding a wide band signal of a speech signal in an encoding apparatus and to decode, in an extended band layer, extended band layer encoded information obtained by encoding an extended band signal of the speech signal whose frequency band is located in higher frequency than the wide band signal in the encoding apparatus, the decoding apparatus comprising:

a band-selector that selects, as a frequency band to which a limiting is applied, a frequency band to be removed from an outputting target in the extended band layer when outputting is performed in the extended band layer; and a band-limiter that applies the limiting to the selected frequency band of a decoded speech signal by removing the selected frequency band from the outputting target, wherein;

the band-selector selects the frequency band to be removed in correlation with a pitch frequency of the decoded speech signal, such that the higher the pitch frequency of the decoded speech signal the wider the frequency band to be removed;

each of the band-selector and the band-limiter is included in at least one processor, and the decoded speech signal is output by the at least one processor in accordance with the selecting by the band-selector and the limiting by the band-limiter.

3. A speech encoding method for encoding a wide band signal of an input speech signal in a first layer and for encoding an extended band signal of the input speech signal, whose frequency band is located in higher frequency than the wide band signal, in an extended band layer, the method comprising:

selecting, as a frequency band to which limiting is applied and using at least one processor, a frequency band to be removed from an encoding target in the extended band layer when encoding is performed in the extended band layer; and applying, using the at least one processor, the limiting to the selected frequency band of an input speech signal by removing the selected frequency band from the encoding target, wherein the frequency band to be removed is selected in correlation with a pitch frequency of the input speech signal, such that the higher the pitch frequency of the input speech signal the wider the frequency band to be removed, and the input speech signal is encoded by the at least one processor in accordance with the selecting and the limiting.

4. A speech decoding method for decoding a wide band signal of a speech signal in a first layer and for decoding an extended band signal of the speech signal whose frequency band is located in higher frequency than the wide band signal in an extended band layer, the method comprising:

selecting, as a frequency band to which limiting is applied and using at least one processor, a frequency band to be removed from an outputting target in the extended band layer when outputting is performed in the extended band layer; and applying, using the at least one processor, the limiting to the selected frequency band of a decoded speech signal by removing the selected frequency band from the outputting target, wherein the frequency band to be removed is selected in correlation with a pitch frequency of the decoded speech signal, such that the higher the pitch frequency of the decoded speech signal the wider the frequency band to be removed, and the decoded speech signal is output by the at least one processor in accordance with the selecting and the limiting.

\* \* \* \* \*